United States Patent
Patel (10) Patent No.: US 10,191,565 B2
(45) Date of Patent: Jan. 29, 2019

(54) ALIGNING COORDINATE SYSTEMS OF TWO DEVICES BY TAPPING

(71) Applicant: Facebook Technologies, LLC, Menlo Park, CA (US)

(72) Inventor: Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/403,009

(22) Filed: Jan. 10, 2017

(65) Prior Publication Data

US 2018/0196528 A1 Jul. 12, 2018

(51) Int. Cl.
| | |
|---|---|
| *G06F 3/0346* | (2013.01) |
| *A63F 13/428* | (2014.01) |
| *G06F 3/038* | (2013.01) |
| *G06F 3/01* | (2006.01) |

(52) U.S. Cl.
CPC .......... *G06F 3/0346* (2013.01); *A63F 13/428* (2014.09); *G06F 3/012* (2013.01); *G06F 3/038* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2013/0147686 A1* | 6/2013 | Clavin | G06F 3/013 345/8 |
| 2014/0132482 A1* | 5/2014 | Yamane | G06F 3/1446 345/1.3 |

* cited by examiner

*Primary Examiner* — Duane N Taylor, Jr.
(74) *Attorney, Agent, or Firm* — Fenwick & West LLP (57) ABSTRACT

An apparatus for aligning coordinate systems of interacting devices includes an interface circuit configured to receive a sensor signal from an accelerometer of a device. The sensor signal represents an impact on the device responsive to tapping of the device and a second device. A second interface circuit is configured to receive a second sensor signal from a second accelerometer of the second device. The second sensor signal represents an impact on the second device responsive to the tapping. A calibration engine is configured to determine a direction of the impact represented by the sensor signal and a direction of the second impact represented by the second sensor signal. The calibration engine is configured to align at least one of a coordinate system of the device or a second coordinate system of the second device based on the direction of the impact and the second impact.

14 Claims, 7 Drawing Sheets

ALIGNING COORDINATE SYSTEMS OF TWO DEVICES BY TAPPING

BACKGROUND

Field of the Disclosure

The present disclosure generally relates to virtual reality devices, and specifically to aligning a head mounted display (HMD) and a controller by tapping these devices.

Description of the Related Arts

Virtual reality (VR) systems typically include devices such as a head mounted display (HMD) and a controller separate from the HMD. The HMD may include a computing device that communicates with the controller to execute various VR programs. Alternatively, a separate computing device may be provided external to the HMD to communicate with the HMD and the controller to execute various VR programs. Moreover, the HMD and an external computing device may process various VR programs in a distributed manner where the HMD and the external computing device perform part of the processing to execute various VR programs.

As the HMD and the controller move independently, each may experience different angles of pitch, roll, and yaw motion in their respective virtual coordinate systems. Pitch motion is motion between a horizontal axis and a vertical axis. Roll motion is circular motion around the horizontal axis. Yaw motion is circular motion around the vertical axis. Using the direction of gravitational acceleration (i.e., downward acceleration) commonly experienced by the HMD and the controller, both devices can correct for drifts in pitch and roll angles in the coordinate systems of the HMD and VR controller. However, because yaw motion occurs around a vertical axis that is in the same direction as the gravitational acceleration, the direction of the gravitational acceleration cannot be used to correct for drifts in yaw angles in the coordinate systems of the HMD and VR controller. Independent yaw motion between the HMD and VR controller can lead to a yaw drift error that may build up over time between the coordinate systems of the HMD and the controller. These spatial mismatches in yaw orientation between the HMD and the controller reduce user experience and immersion in a VR environment.

SUMMARY

Embodiments relate to an apparatus for aligning coordinate systems of interacting VR devices. The apparatus includes a first interface circuit receiving a first sensor signal from a first accelerometer of a first device. The first sensor signal represents a first impact on the first device responsive to tapping of the first device and a second device. A second interface circuit receives a second sensor signal from a second accelerometer of the second device. The second sensor signal represents an impact on the second device responsive to the tapping. A calibration engine determines a direction of the first impact represented by the first sensor signal. The calibration determines a direction of the second impact represented by the second sensor signal. The calibration engine aligns at least one of a first coordinate system of the first device or a second coordinate system of the second device based on the direction of the first impact and the direction of the second impact.

In one embodiment, the direction of the first impact and the direction of the second impact in the aligned first coordinate system or the aligned second coordinate system are opposite.

In one embodiment, the first device is a head mounted display and the second device is a controller.

In one embodiment, the tapping is performed on a side or front section of the head mounted display.

In one embodiment, the calibration engine aligns at least one of the first coordinate system of the first device or the second coordinate system of the second device by determining an angular difference between the direction of the first impact in the first coordinate system and the direction of the second impact in the second coordinate system. The calibration engine rotates at least one of the first coordinate system or the second coordinate system according to the angular difference.

In one embodiment, the first device is further sends the first impact from the first device to the second device or a third device communicating with the first device and the second device to rotate at least one of the first coordinate system or the second coordinate system.

In one embodiment, the calibration engine is further configured to determine a distance between the first device and the second device, and align at least one of the first coordinate system of the first device or the second coordinate system of the second device if the distance is below a threshold distance.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

A preferred embodiment is described herein with reference to the figures where like reference numbers indicate identical or functionally similar elements. Also in the figures, the left most digits of each reference number corresponds to the figure in which the reference number is first used.

Embodiments relate to aligning coordinate systems of two devices (e.g., an HMD and a controller) by using impacts detected as result of tapping the two devices. Each device has its own respective coordinate system that may drift in terms of yaw angles during use. To align the coordinate systems of the two devices, tapping is performed between the two devices. The direction of the impacts due to the tapping is measured at the first and second devices. Based on the principle that the two impacts should point in opposite directions, an angular difference in the coordinate systems of both devices may be determined by comparing the direction of two impacts. The result of comparison can be used to rotate one or both of the coordinate systems to realign them.

A coordinate system described herein refers to a system which uses one or more numbers, or coordinates, to uniquely determine the position of a point or other geometric element in space such as Euclidean space. A coordinate system may be represented as a Cartesian coordinate system, number lines, polar coordinate system, cylindrical or spherical coordinate system, homogeneous coordinate system, curvilinear coordinates, orthogonal coordinates, skew coordinates, log-polar coordinate system, Plücker coordinates, generalized coordinates, canonical coordinates, etc.

A device described herein refers to a virtual reality (VR) device that runs or interfaces with computer programs to generate realistic images, sounds and other sensations that replicate a real environment (or create an imaginary setting), and simulate a user's physical presence in this environment, by enabling the user to interact with this space and any objects depicted therein.

Example Yaw Movement for HMD

Figure 1:
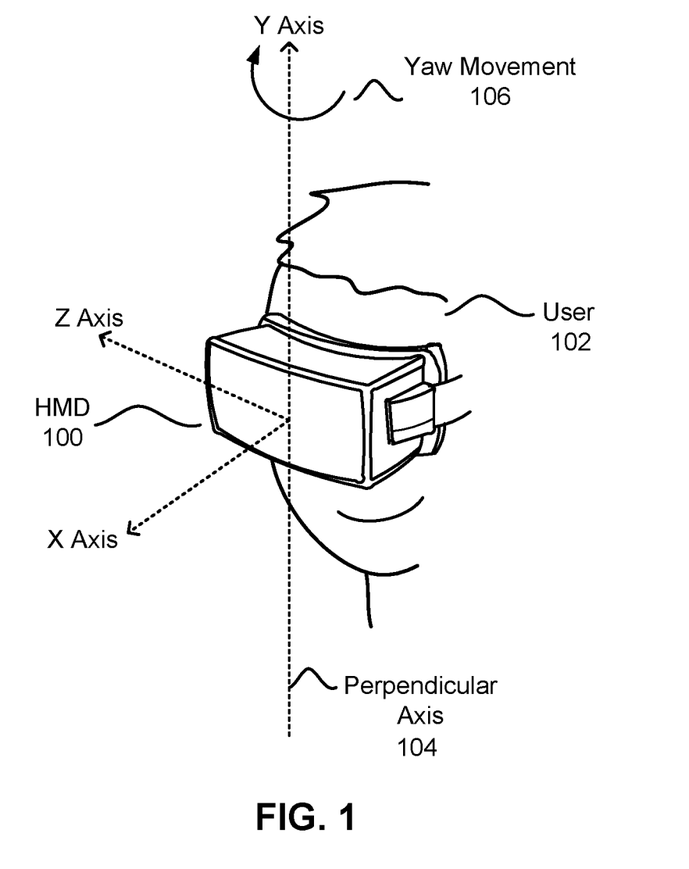
FIG. 1 is a schematic perspective view of example yaw movement for an HMD, in accordance with an embodiment.

FIG. 1 is a schematic perspective view of example yaw movement for an HMD 100, in accordance with an embodiment. The HMD 100 is worn on the user 102's head or as part of a helmet that has a display in front of one eye (monocular HMD) or each eye (binocular HMD). The HMD 100 may also be an optical head-mounted display (OHMD) that reflects projected images and allows the user 102 to see through it. The HMD 100 may display computer-generated imagery (CGI), live imagery from the physical world, or a combination. The HMD 100 may allow CGI to be superimposed on a real-world view (referred to as augmented reality or mixed reality).

In one embodiment, a coordinate system for the HMD 100 shown in FIG. 1 is represented by three axes. The perpendicular axis 104, also called the normal axis, yaw axis, or Y axis, is an axis drawn from top to bottom, and perpendicular to the other two axes. The lateral axis, also called the transverse axis, pitch axis, or Z axis, is an axis running from the HMD 100's or user 102's left to right. The longitudinal axis, also called the roll axis or X axis, is an axis drawn through the body of the HMD 100 from tail to nose in the direction the user 102 and HMD 100 face. The movement 106 about the perpendicular axis 104 is called yaw movement and determines which way the HMD 100 and user 102 are pointed. Because yaw movement 106 occurs circularly around the perpendicular axis 104, the direction of gravitational acceleration cannot be used to correct for drifts in yaw between the coordinate systems of the HMD 100 and controller.

In a VR environment or augmented reality world, the HMD 100 may continuously adjust its information over time of its position and position of virtual objects in its coordinate system. Independent yaw motion between the HMD 100 and a controller may lead to yaw drift error between the coordinate systems of the HMD 100 and controller. Due to such a drift error, the HMD 100 may display an angular error in the yaw direction to the user 102, even when both the HMD 100 and controller are pointing in the same direction. These spatial mismatches in yaw orientation between the HMD 100 and controller reduce the user 102's experience and immersion in a VR environment.

Example Coordinate Systems

Figure 2:
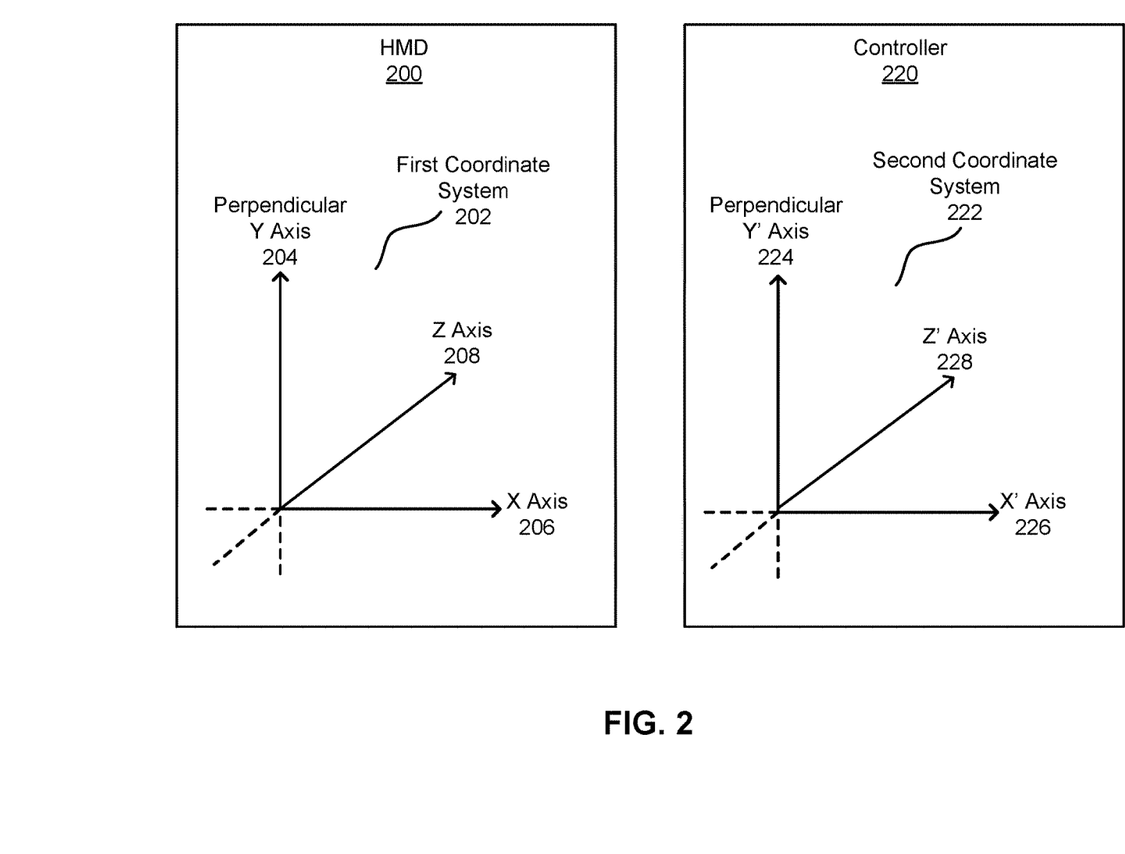
FIG. 2 is an illustration of example coordinate systems for an HMD and a controller, where both coordinate systems are aligned, in accordance with an embodiment.

FIG. 2 is an illustration of example coordinate systems for an HMD 200 and a controller 220, where both coordinate systems are aligned, in accordance with an embodiment. The HMD 200 performs various operations such as displaying images using the first coordinate system 202. The first coordinate system 202 includes a perpendicular Y axis 204, a longitudinal X axis 206, and a lateral Z axis 208, as described above with reference to FIG. 1. The first coordinate system 202 shown in FIG. 2 may be represented as this ordered triplet of lines (perpendicular Y axis 204, X axis 206, and Z axis 208) that are pair-wise perpendicular, have a single unit of length for all three axes and have an orientation for each axis. The first coordinate system 202 may specify the position of the HMD 200 uniquely in a plane by three numerical coordinates, which are the distances to the HMD 200 from the three fixed perpendicular directed axes (perpendicular Y axis 204, X axis 206, and Z axis 208).

The first coordinate system 202 is a virtual coordinate system of the HMD 200 to position and orient the HMD 200 and objects in the VR space. A real coordinate system, on the other hand, is a coordinate system that has real-world meaning as a spatial coordinate system. Virtual coordinate systems may map back to the real coordinate system. In a VR environment or augmented-reality world, as angular drift in the yaw direction develops, the first coordinate system 202 may misalign with the real coordinate system. The operation of the controller 220 is based on the second coordinate system 222 shown in FIG. 2. The second coordinate system 222 includes a perpendicular Y' axis 224, a longitudinal X' axis 226, and a lateral Z' axis 228. The longitudinal X' axis 226, is the axis drawn through the body of the controller 220 from tail to nose in the direction the user 102 is pointing the controller 220.

In FIG. 2, the first coordinate system 202 and the second coordinate system 222 (both of which are virtual coordinate systems) are aligned with each other—there is no yaw drift between the first coordinate system 202 of the HMD 200 and the second coordinate system 222 of the controller 220. The direction of the perpendicular Y axis 204 is the same as the direction of the perpendicular Y' axis 224. The direction of the X axis 206 is the same as the direction of the X' axis 226. The direction of the Z axis 208 is the same as the direction of the Z' axis 228. However, independent yaw motion between the HMD 200 and the controller 220 can lead to yaw drift error that may build up over time between the coordinate systems of the HMD 200 and the controller 220. Although both the HMD 200 and the controller 220 may be pointing in the same real direction, the HMD 200 may display an angular error in the yaw direction to the user 102, leading the user 102 to believe that the HMD 200 is pointing in a different direction.

Example Yaw Drift in a Coordinate System

Figure 3:
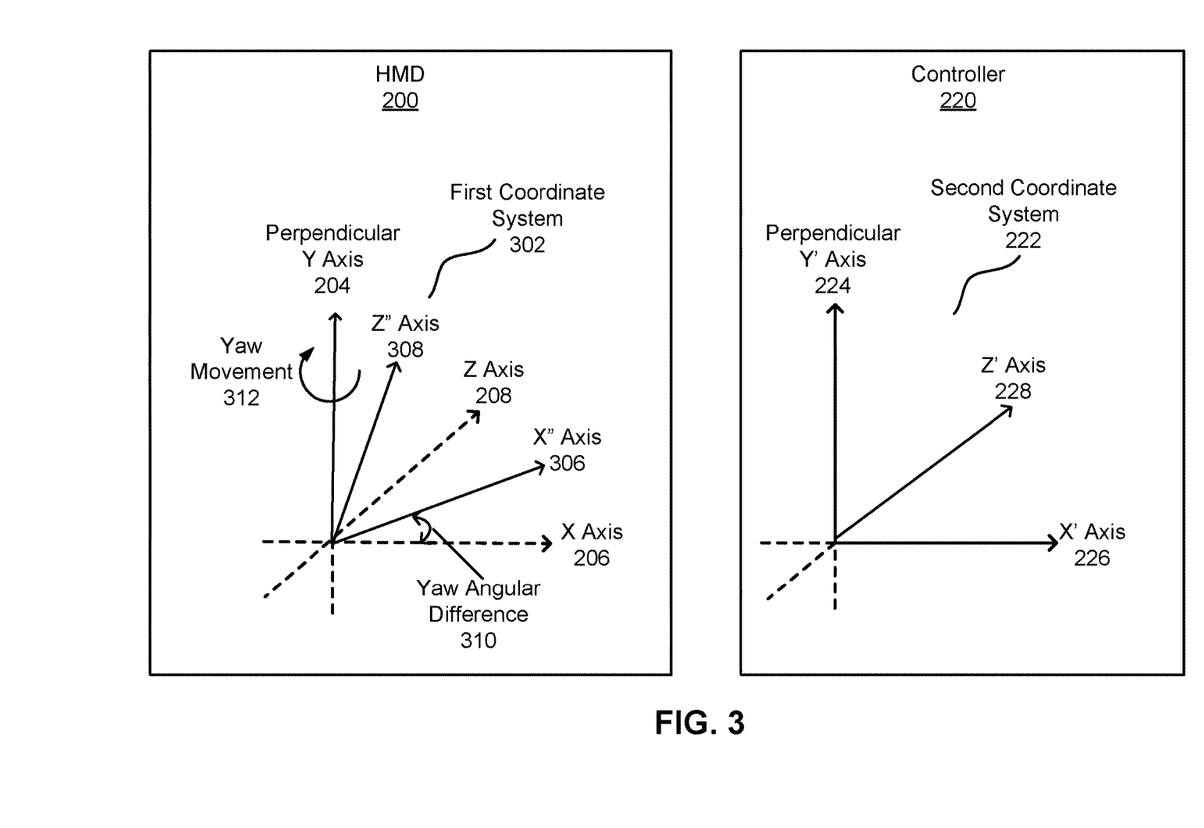
FIG. 3 is an illustration of example coordinate systems for an HMD and a controller, where the two coordinate systems are not aligned due to yaw drift, in accordance with an embodiment.

FIG. 3 is an illustration of example coordinate systems for an HMD 200 and a controller 220, where the two coordinate systems are not aligned due to yaw drift, in accordance with an embodiment. The first coordinate system 302 for the HMD 200 includes the perpendicular Y axis 204. The original X axis 206 and original Z axis 208 from FIG. 2 are shown in FIG. 3 using dashed lines. As a result of the yaw movement 312 around the perpendicular Y axis 204, the X and Z axes of the first coordinate system 302 on the horizontal plane may get misaligned from the original X axis 206 and original Z axis 208 by a yaw angular difference 310 that may build up over time. As a result, the first coordinate system 302 of the HMD 200 retains the original perpendicular Y axis 204 but has two different axes in the horizontal plane—the X" axis 306 and Z" axis 308. The X" axis 306 is rotated by the yaw angular difference 310 from the original X axis 206. The Z" axis 308 is rotated by the yaw angular difference 310 from the original Z axis 208.

The second coordinate system 222 shown in FIG. 3, which is independent from the first coordinate system 302, belongs to the controller 220. The second coordinate system 222 includes the original perpendicular Y' axis 224, original X' axis 226, and original Z' axis 228 because there is no yaw drift in the second coordinate system 222.

As a result of the yaw angular difference 310 shown in FIG. 3 between the X" axis 306 and original X axis 206, the first coordinate system 302 of the HMD 200 is no longer aligned with the second coordinate system 222 of the controller 220. The direction of the perpendicular Y axis 204 is the same as the direction of the perpendicular Y' axis 224. However, the direction of the X" axis 306 is rotated from the direction of the X' axis 226 by the yaw angular difference 310. The direction of the Z" axis 308 is rotated from the direction of the Z' axis 228 by the yaw angular difference 310. As a result, if the user 102 and HMD 200 (HMD) are facing in the same direction (X' axis 226) of the controller 220, it may appear to the user 102 that the HMD 200 is rotated by the yaw angular difference 310 in the direction of the X" axis 306.

Example Schematic Diagram for Tapping of the HMD and Controller

Figure 4:
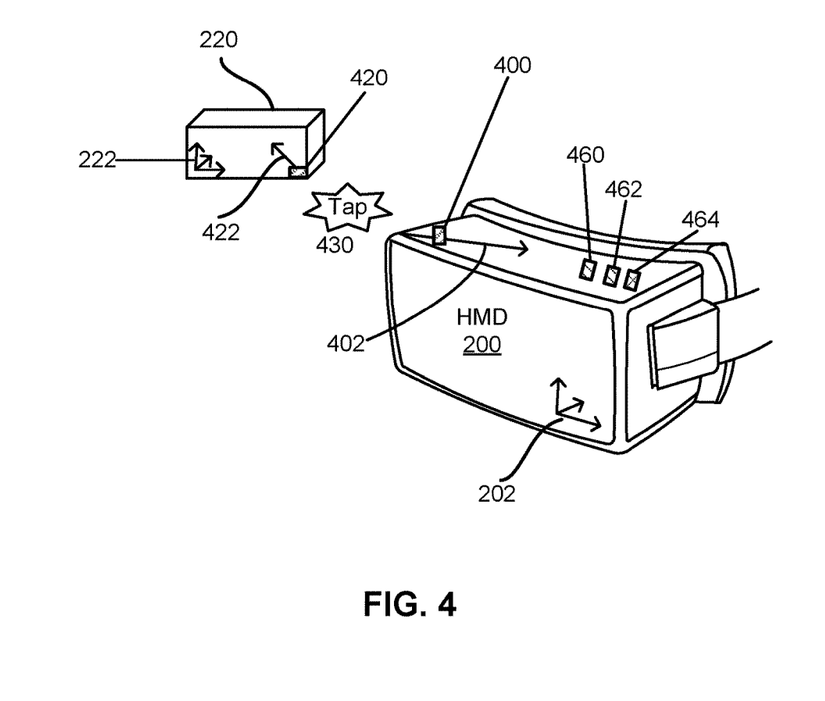
FIG. 4 is a schematic diagram illustrating tapping of an HMD and a controller, in accordance with an embodiment.

FIG. 4 is a schematic diagram illustrating tapping of the HMD 200 and the controller 220, in accordance with an embodiment. The HMD 200 may include, among other components, the first coordinate system 202, a first accelerometer 400, a first impact 402, a first interface circuit 460, a second interface circuit 462, and a calibration engine 464. The first coordinate system 202 is a virtual coordinate system of the HMD 200 to position and orient the HMD 200, as described and illustrated above with reference to FIG. 2. The first coordinate system 202 includes the X, Y, and Z axes, as described and illustrated above with reference to FIG. 2.

The first accelerometer 400 shown in FIG. 4 is located within the HMD 200 to measure the first impact 402 within the first coordinate system 202 of the HMD 200 when the HMD 200 is tapped by the controller 220 at the tap site 430. The tap site 430 is the location where the external housings of the devices 200 and 220 contact when tapped. The controller 220 may tap the HMD 200 on a side or front section of the HMD 200. For example, the controller 220 may tap the HMD 200 on the side of the HMD 200's housing next to the user 102's forehead. The first accelerometer 400 may measure the first impact 402 within the first coordinate system 202 in the form of acceleration and time. A first sensor signal representing the first impact 402 may be retrieved (or transmitted by the HMD 220) to be viewed and evaluated by the first interface circuit 460 and the calibration engine 464.

The first interface circuit 460 is a digital or analog circuit that receives a first sensor signal from the first accelerometer 400 of the HMD 200. The first sensor signal represents the first impact 402 on the HMD 200 responsive to tapping of the HMD 200 and the controller 220. The second interface circuit 462 receives a second sensor signal from a second accelerometer of the controller 220. The second sensor signal represents a second impact 422 on the controller 220 responsive to the tapping. The calibration engine 464 determines a direction of the first impact 402 represented by the first sensor signal and a direction of the second impact 422 represented by the second sensor signal. The direction of the first impact 402 and the direction of the second impact 422 in the aligned first coordinate system 202 or the aligned second coordinate system 222 are opposite.

The calibration engine 464 aligns at least one of the first coordinate system 202 of the HMD 200 or a second coordinate system 222 of the controller 220 according to the direction of the first impact 402 and the direction of the second impact 422. The calibration engine 464 is a digital or analog computing device whose operation is described in more detail below with reference to FIGS. 5 and 6. In some embodiments, the first interface circuit 460, the second interface circuit 462, and the calibration engine 464 may be located within the controller 220 or within a computing device external to both the HMD 200 and the controller 220, as illustrated and described below with reference to FIG. 6.

The controller 220 shown in FIG. 4 may be a gesture controller that translates the natural movement of the user 102's hands or body, such as pointing grabbing, punching, or picking up objects, into tangible action in a virtual world. The controller 220 may be a wearable device that senses the user 102's arm, hand, and finger movements to create tangible controls on the VR content. The controller 220 may include tactile feedback sensors providing the user 102 with surface and shape sensations and providing haptic feedback to the computing device using swiping gestures to allow the user 102 to move around a virtual environment. The controller 220 may be Bluetooth-enabled to provide full-body motion and positional tracking to Android and iOS VR headsets.

The controller 220 shown in FIG. 4 includes the second coordinate system 222, a second accelerometer 420, and second impact 422. The second coordinate system 222 is a virtual coordinate system of the controller 220 to position and orient the controller 220, as described and illustrated above with reference to FIG. 2. The second accelerometer 420 is located within the controller 220 to measure the second impact 422 within the second coordinate system 222 of the controller 220 after the controller 220 taps the HMD 200 at the tap site 430. The second accelerometer 420 measures the second impact 422 within the second coordinate system 202 in the form of acceleration and time. The second impact 422 may be retrieved (or transmitted by the controller 220) as the second sensor signal to be viewed and evaluated by the second interface circuit 462 and the calibration engine 464 after it has been measured. The second accelerometer 420 may be a piezoresistive or piezoelectric accelerometer that operates as described above with reference to the first accelerometer 400.

Example Impacts

Figure 5:
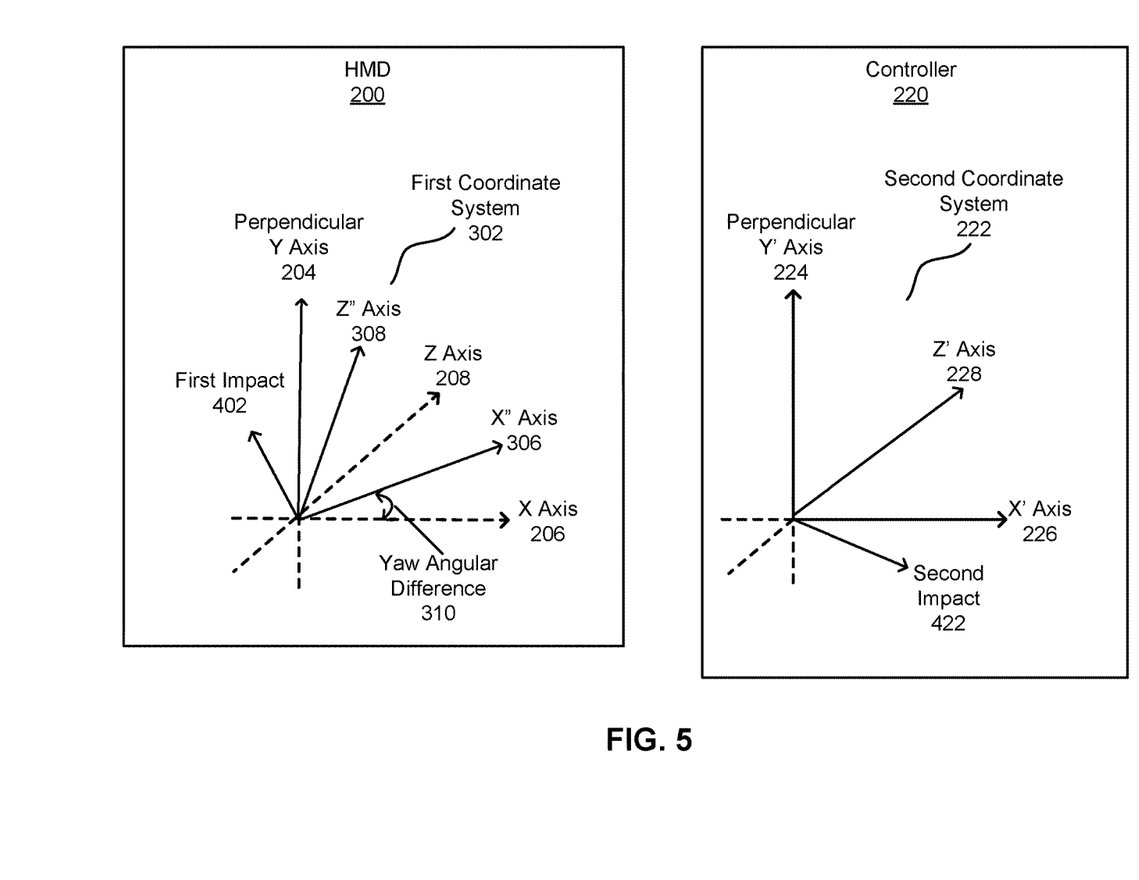
FIG. 5 is an illustration of example impacts in an HMD and a controller, in accordance with an embodiment.

FIG. 5 is an illustration of example impacts 402 and 422 in an HMD 200 and a controller 220, in accordance with an embodiment. The first coordinate system 302 of the HMD 200 includes the perpendicular Y axis 204, X axis 206, Z axis 208, drifted X" axis 306, drifted Z" axis 308, and the first impact 402 measured by the first accelerometer 400. The second coordinate system 222 of the controller 220 includes the perpendicular Y' axis 224, X' axis 226, Z' axis 228, and the second impact 422 measured by the second accelerometer 420.

As described above with reference to FIG. 4, the system for aligning virtual reality devices includes tapping the controller 220 on the HMD 200 and measuring the first impact 402 within the first coordinate system 302 of the HMD 200. The system measures the second impact 422 within the second coordinate system 222 of the controller 220. The system determines the angular difference 310 between the direction of the first impact 402 and the direction of the second impact 422. The system aligns at least one of the first coordinate system 302 or the second coordinate system 222 according to the determined angular difference.

For example, when there is no yaw drift or deviation between the first coordinate system 302 and the second coordinate system 222, the angle between the X axis 206 and the X' axis 226 is 0°. If the controller 220 taps on the HMD 200, the first accelerometer 400 measures the first impact 402 as aligned with the second impact 422 measured by the second accelerometer 420. The direction of the first impact 402 is directly opposite to the direction of the second impact 422 (that is, the directions of the two impacts 402 and 422 should form an angle of 180°). If the direction of the X axis 206 is rotated from the direction of the X' axis 226 by 30° due to yaw drift build-up over time, the direction of the X" axis 306 is rotated from the direction of the X' axis 226 by the yaw angular difference 310 of 30°. If the controller 220 taps the HMD 200, the direction of the measured first impact 402 is not directly opposite to the direction of the second impact 422. The system measures the direction of the first impact 402 as rotated from the direction of the second impact 422 by 150°. The system may align the first coordinate system 402 by rotating it back by 180°-150°, i.e., 30°. The system may also reverse the direction of the first impact 402 to be directly opposite. The direction of the reversed first impact 402 is rotated from the direction of the measured second impact 422 by the yaw angular difference 310 of 30°. The system may also align the second coordinate system 422 by 30°. The system may also align both coordinate systems 402 and 422 such that they are rotated back by 30°.

Example Coordinate Calibration System

Figure 6:
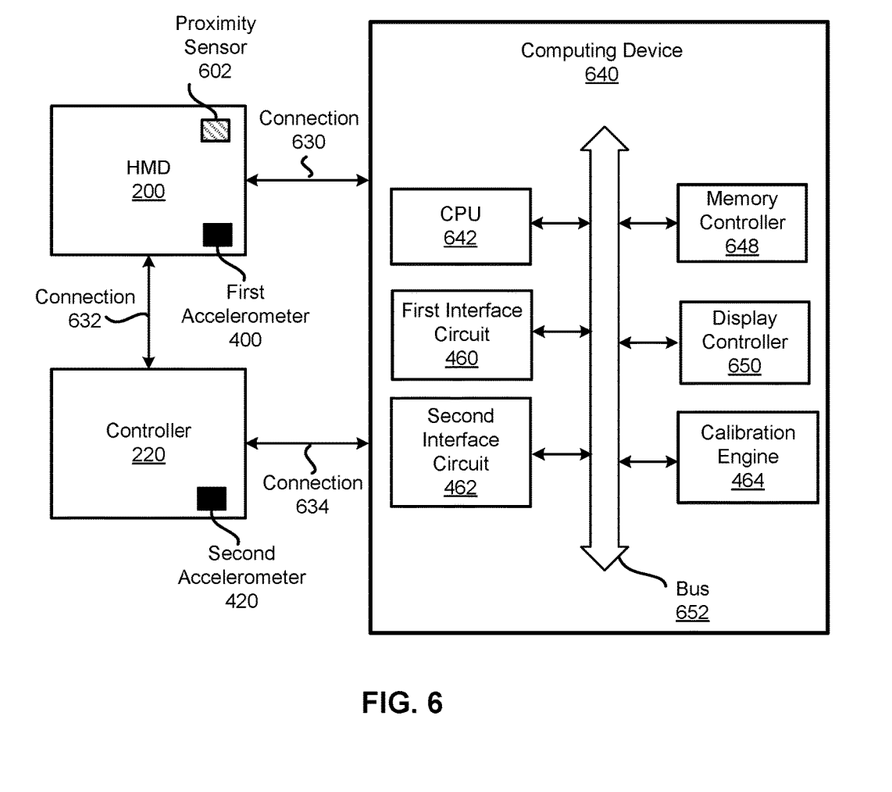
FIG. 6 is a schematic diagram of an example architecture of a system including a computing device, in accordance with an embodiment.

FIG. 6 is a schematic diagram of an example architecture of a system including a computing device 640, in accordance with an embodiment. The system in FIG. 6 includes the HMD 200 and controller 220. The HMD 200 and computing device 640 may communicate over connection 630, which may be configured wirelessly as a digital bit stream or a digitized analog signal over a point-to-point or point-to-multipoint communication channel, e.g., copper wires, optical fibers, wireless communication channels, storage media and computer buses. The HMD 200 and controller 220 may communicate over connection 632, which may be configured wirelessly as a digital bit stream or a digitized analog signal over a point-to-point or point-to-multipoint communication channel, e.g., copper wires, optical fibers, wireless communication channels, storage media and computer buses. The controller 220 and computing device 640 may communicate over connection 634, which may be configured wirelessly as a digital bit stream or a digitized analog signal over a point-to-point or point-to-multipoint communication channel, e.g., copper wires, optical fibers, wireless communication channels, storage media and computer buses.

The HMD 200 shown in FIG. 6 includes the first accelerometer 400 and a proximity sensor 602. The first accelerometer 400 measures the first impact 402 within the first coordinate system 202 of the HMD 200 when the controller 220 taps on the HMD 200, as illustrated and described in detail above with reference to FIG. 4. The proximity sensor 602 within the HMD 200 detects the presence of the controller 220 when it is nearby. The proximity sensor 602 may be a capacitive sensor, a photoelectric sensor, an inductive proximity sensor, etc. The proximity sensor 602 may emit an electromagnetic field or beam, and determine if there are changes in the electromagnetic field or return signal from the controller 220. The section of the HMD 200 housing the proximity sensor may be coated with conductive material. A voltage may be applied to this conductive layer, resulting in a uniform electrostatic field. When the controller 220 taps the surface of the HMD 200, a capacitor is dynamically formed. The proximity sensor 602 may determine the presence of the controller 220 and location of the tapping from the change in the capacitance.

The controller 220 shown in FIG. 6 includes the second accelerometer 420. The second accelerometer 400 measures the second impact 422 within the second coordinate system 222 of the controller 220 when the controller 220 taps on the HMD 200, as illustrated and described in detail above with reference to FIG. 4.

The computing device 640 shown in FIG. 6 may be a hardware device connected over a wireless network or hardwired to the HMD 200 and controller 220, as described above. The computing device 640 may be a server computer, a client computer, a personal computer (PC), a tablet PC, or any machine capable of executing instructions (sequential or otherwise) that specify actions to be taken by the HMD 200 and controller 220. The computing device 640 may include a processor such as a central processing unit (CPU 642), a first interface circuit 460, a second interface circuit 462, a calibration engine 464, a memory controller 648, a display controller 650, etc. The computing device 640 executes instructions, e.g., program code or software, for causing the HMD 200 and controller 220 to perform any one or more of the methodologies (or processes) described herein. The CPU 642 shown in FIG. 6 may carry out the instructions of a coordinate aligning computer program by performing the basic arithmetic, logical, control and input/output (I/O) operations specified by the instructions. The CPU 642 may be a microprocessor contained on a single integrated circuit (IC) chip.

The first interface circuit 460 is configured to receive a first sensor signal representing the measured first impact 402 from the first accelerometer 400 of the HMD 200 over connection 630. The second interface circuit 462 is configured to receive a second sensor signal representing the measured second impact 422 from the second accelerometer 420 of the controller 220 over connection 634. The first interface circuit 460 and the second interface circuit 462 may include dedicated hardware or software networking devices supporting any of Ethernet, Fiber Channel, Wi-Fi, Token Ring, FireWire, etc., configured to receive the first and second sensor signals in the form of one or more of a current, a voltage, and an electromagnetic wave.

The calibration engine 464 shown in FIG. 6 may be a digital or analog computing device located within or external to the computing device 640 to determine a direction of the first impact 402 represented by the first sensor signal and a direction of the second impact 422 represented by the second sensor signal. The calibration engine 464 determines the angular difference 310 between the direction of the first impact 402 and the direction of the second impact 422, and aligns at least one of the first coordinate system 202 or the second coordinate system 222 according to the determined angular difference 310. The calibration engine 464 may send information corresponding to the determined angular difference 310 to the HMD 200 or the controller 220 over connection 630 or connection 634, respectively, to align at least one of the first coordinate system 202 or the second coordinate system 222 according to the determined angular difference 310.

In FIG. 6, the first interface circuit 460, the second interface circuit 462, and the calibration engine 464 are shown located within the computing device 640. In embodiments, the first interface circuit 460, the second interface circuit 462, and the calibration engine 464 may be located external to the computing device 640 within the HMD 200 or controller 220, as illustrated and described with reference to FIG. 4. In embodiments, the calibration engine 464 may be located within the HMD 200. The controller 220 may send the second sensor signal corresponding to the measured second impact 422 to the HMD 200 over connection 632. The calibration engine 464 in the HMD 200 may determine the angular difference 310 between the measured first impact 402 and second impact 422. The HMD 200 may align the first coordinate system 202 or send information corresponding to the determined angular difference 310 to the controller 220 over connection 632 to align the second coordinate system 222 according to the determined angular difference 310.

In embodiments, the first interface circuit 460, the second interface circuit 462, and the calibration engine 464 shown in FIG. 6 may be located within the controller 220. The HMD 200 may send the first sensor signal corresponding to the measured first impact 402 to the controller 220 over connection 632. The calibration engine 464 within the controller 220 may determine the angular difference 310 between the measured first impact 402 and second impact 422. The controller 220 may align the second coordinate system 222 or send information corresponding to the determined angular difference 310 to the HMD 200 over connection 632 to align the first coordinate system 202 according to the determined angular difference 310.

The system shown in FIG. 6 may also include operation by the proximity sensor 602. The proximity sensor 602 located within the HMD 200 may be configured to measure a distance d between the HMD 200 and the controller 220. The calibration engine 464 may determine the angular difference 310 and communicate it to one of the two user interface devices 200 or 220 only if the distance d between the HMD 200 and the controller 220 is below a threshold distance. In this manner, the system ensures that accidental tapping by an unrelated object on either the HMD 200 or the controller 220 does not lead the calibration engine 464 to align the two coordinate systems 202 and 222.

The memory controller 648 may be a digital circuit that manages the flow of data going to and from the computing device 640's main memory. The memory controller 648 may be a separate chip or integrated into another chip, such as being placed on the same die or as an integral part of a microprocessor. The display controller 650 may be an integrated circuit that generates the timing of horizontal and vertical synchronization signals for a display panel of the HMD 200 or the controller 220. The display controller 650 may be completely integrated in the logic of the computing device 640 or it may function as a coprocessor that can manipulate the RAM contents for the display panel of the HMD 200 or the controller 220. The CPU 642, first interface circuit 460, second interface circuit 462, the calibration engine 464, the network interface 646, the memory controller 648, and the display controller 650 may communicate via a bus 514.

Example Process for Aligning VR Coordinate System

Figure 7:
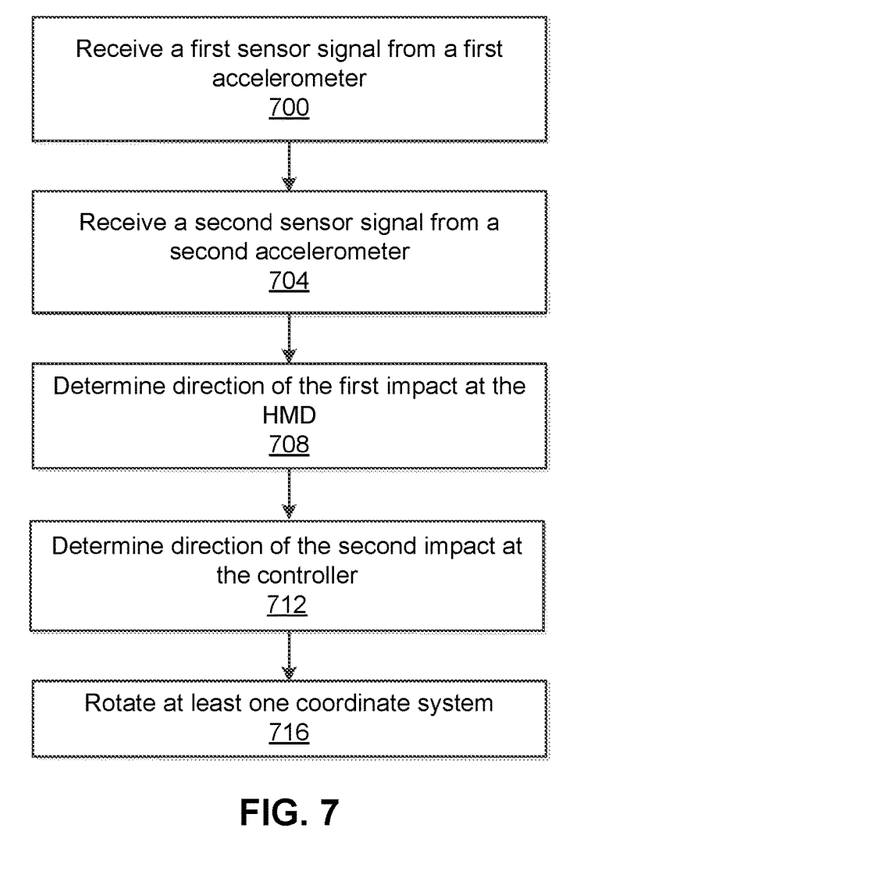
FIG. 7 is a flowchart illustrating an example process for aligning coordinate systems of an HMD and controller, in accordance with an embodiment.

FIG. 7 is a flowchart illustrating an example process for aligning coordinate systems of an HMD 200 and controller 220, in accordance with an embodiment. In some embodiments, the process may have different and/or additional steps than those described in conjunction with FIG. 7. Steps of the process may be performed in different orders than the order described in conjunction with FIG. 7. Some steps may be executed in parallel. Alternatively, some of the steps may be executed in parallel and some steps executed sequentially. Alternatively, some steps may execute in a pipelined fashion such that execution of a step is started before the execution of a previous step.

The coordinate aligning system receives 700 a first sensor signal from the first accelerometer 400 of the HMD 200. The first sensor signal represents the first impact 402 on the HMD 200 responsive to tapping of the HMD 200 and the controller 220. The system receives 704 a second sensor signal from the second accelerometer 420 of the controller 220. The second sensor signal represents the second impact 422 on the controller 220 responsive to the tapping. The system determines 708 a direction of the first impact 402 represented by the first sensor signal. The system determines 712 a direction of the second impact 422 represented by the second sensor signal. The system aligns at least one of the first coordinate system 202 of the HMD 200 or the second coordinate system 222 of the controller 220 according to the direction of the first impact 402 and the direction of the second impact 422.

The foregoing description of the embodiments has been presented for the purpose of illustration; it is not intended to be exhaustive or to limit the embodiments to the precise forms disclosed. Finally, the language used in the specification has been principally selected for readability and instructional purposes, and it may not have been selected to delineate or circumscribe the embodiments. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. An apparatus for aligning coordinate systems of interacting devices, the apparatus comprising:
   a first interface circuit configured to receive a first sensor signal from a first accelerometer of a head mounted display that is configured to display images in accordance with a first coordinate system, the first sensor signal representing a first impact on the head mounted display responsive to tapping of the head mounted display and a controller;
   a second interface circuit configured to receive a second sensor signal from a second accelerometer of the controller that is configured to receive at least one user input associated with a second coordinate system, the second coordinate system misaligned with the first coordinate system prior to the tapping, the second sensor signal representing a second impact on the second device responsive to the tapping; and
   a processor configured to:
      determine a direction of the first impact represented by the first sensor signal;
      determine a direction of the second impact represented by the second sensor signal; and adjust at least one of the first coordinate system of the head mounted display or the second coordinate system of the controller according to the direction of the first impact and the direction of the second impact to reduce misalignment of the second coordinate system with the first coordinate system.

2. The apparatus of claim 1, wherein the direction of the first impact and the direction of the second impact in the aligned first coordinate system or the aligned second coordinate system are opposite.

3. The apparatus of claim 1, wherein the tapping is performed on a side or front section of the head mounted display.

4. The apparatus of claim 1, wherein the processor is configured to align at least one of the first coordinate system of the head mounted display or the second coordinate system of the controller by:
   determining an angular difference between the direction of the first impact in the first coordinate system and the direction of the second impact in the second coordinate system; and
   rotating at least one of the first coordinate system or the second coordinate system according to the angular difference.

5. The apparatus of claim 1, wherein the head mounted display is further configured to send the first sensor signal to an electronic device communicating with the head mounted display and the controller to rotate at least one of the first coordinate system or the second coordinate system.

6. The apparatus of claim 1, wherein the processor is further configured to:
   determine a distance between the head mounted display and the controller; and
   align at least one of the first coordinate system or the second coordinate system responsive to the distance being below a threshold distance.

7. A method for aligning coordinate systems of interacting devices, the method comprising:
   receiving a first sensor signal from a first accelerometer of a head mounted display that is configured to display images in accordance with a first coordinate system, the first sensor signal representing a first impact on the head mounted display responsive to tapping of the head mounted display and a controller;
   receiving a second sensor signal from a second accelerometer of the controller that is configured to receive at least one user input associated with a second coordinate system, the second coordinate system misaligned with the first coordinate system prior to the tapping, the second sensor signal representing a second impact on the controller responsive to the tapping;
   determining a direction of the first impact represented by the first sensor signal;
   determining a direction of the second impact represented by the second sensor signal; and
   adjusting at least one of the first coordinate system of the head mounted display or the second coordinate system of the controller according to the direction of the first impact and the direction of the second impact to reduce misalignment of the second coordinate system with the first coordinate system.

8. The method of claim 7, wherein the direction of the first impact and the direction of the second impact in the aligned first coordinate system or the aligned second coordinate system are opposite.

9. The method of claim 7, wherein the tapping is performed on a side or front section of the head mounted display.

10. The method of claim 7, wherein aligning at least one of the first coordinate system of the head mounted display or the second coordinate system of the controller comprises:
    determining an angular difference between the direction of the first impact in the first coordinate system and the direction of the second impact in the second coordinate system; and
    rotating at least one of the first coordinate system or the second coordinate system according to the angular difference.

11. The method of claim 7, further comprising:
    sending the first sensor signal from the head mounted display to an electronic device communicating with the head mounted display and the controller to rotate at least one of the first coordinate system or the second coordinate system.

12. The method of claim 7, further comprising:
    determining a distance between the head mounted display and the controller; and
    aligning at least one of the first coordinate system or the second coordinate system of responsive to the distance being below a threshold distance.

13. The apparatus of claim 1, wherein the misalignment is caused by yaw movement of the head mounted display.

14. The method of claim 7, wherein the misalignment is caused by yaw movement of the head mounted display.

* * * * *

UNITED STATES PATENT AND TRADEMARK OFFICE
CERTIFICATE OF CORRECTION

PATENT NO. : 10,191,565 B2
APPLICATION NO. : 15/403009
DATED : January 29, 2019
INVENTOR(S) : Nirav Rajendra Patel Page 1 of 1

It is certified that error appears in the above-identified patent and that said Letters Patent is hereby corrected as shown below:

In the Claims

Column 12, Claim 12, Line 5, delete "system of responsive" and insert -- system responsive --

Signed and Sealed this
Fourth Day of June, 2019

Andrei Iancu
*Director of the United States Patent and Trademark Office*